B. M. W. HANSON.
FEEDING MECHANISM.
APPLICATION FILED APR. 20, 1909.
940,929.
Patented Nov. 23, 1909.
4 SHEETS—SHEET 1.
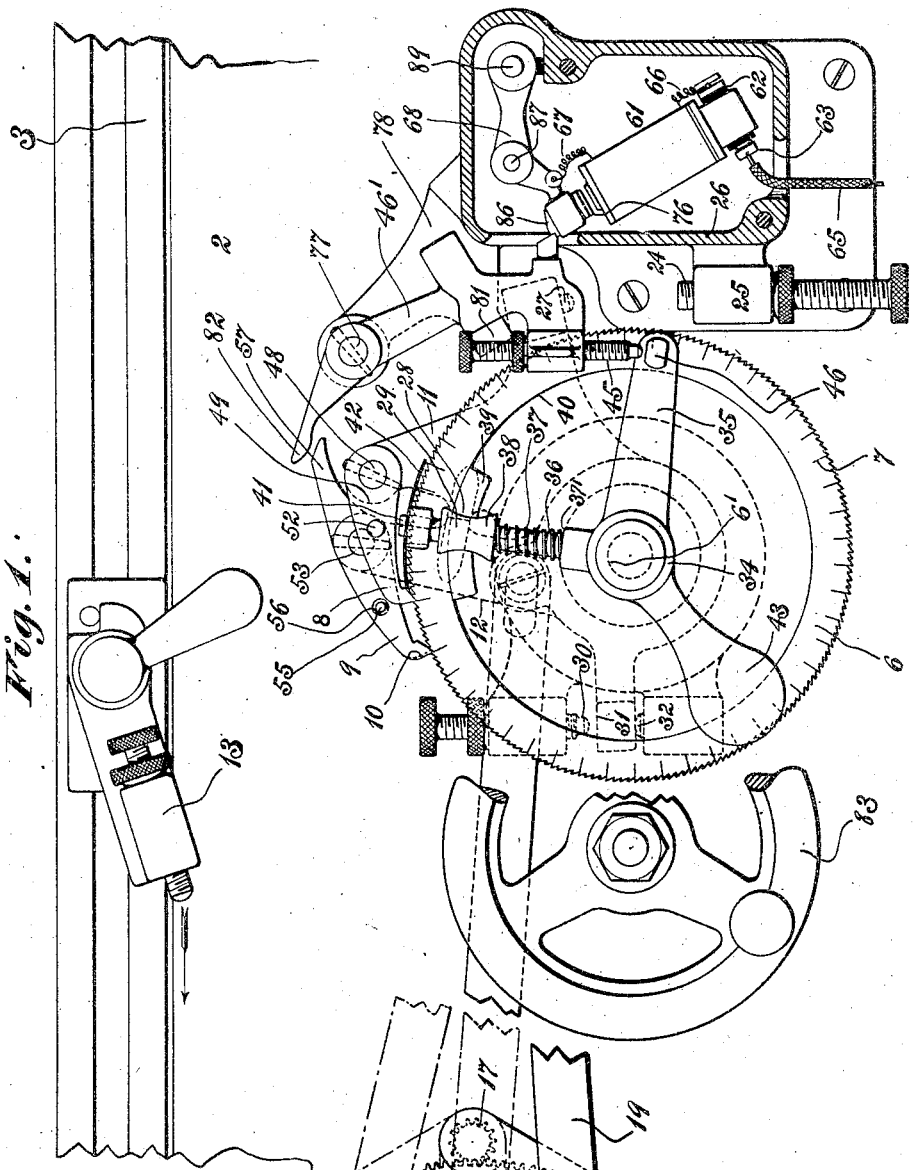
Fig. 1.
Witnesses:
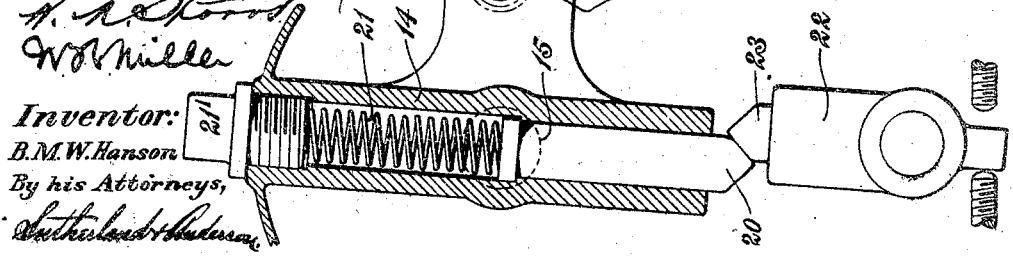
Inventor:
B. M. W. Hanson
By his Attorneys,

B. M. W. HANSON.
FEEDING MECHANISM.
APPLICATION FILED APR. 20, 1909.

940,929.

Patented Nov. 23, 1909.
4 SHEETS—SHEET 3.

Witnesses:
Inventor:
B. M. W. Hanson
By his Attorneys,
Sutherland & Anderson

B. M. W. HANSON.
FEEDING MECHANISM.
APPLICATION FILED APR. 20, 1909.
940,929.
Patented Nov. 23, 1909.
4 SHEETS—SHEET 4.
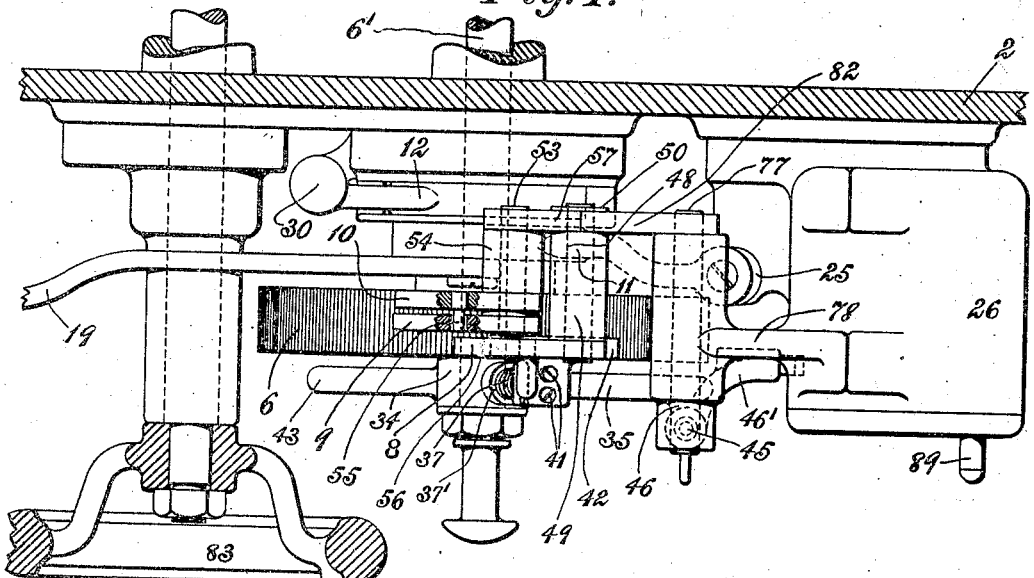
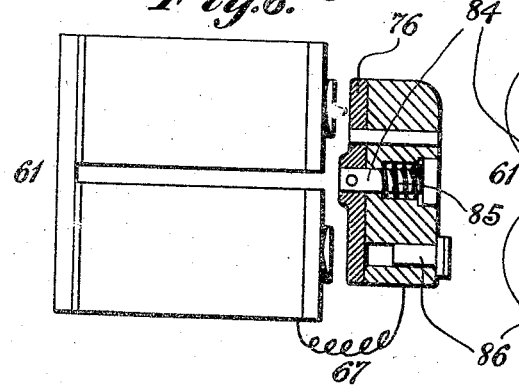
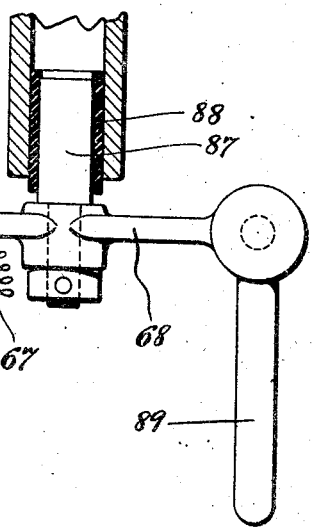
Witnesses:
Inventor:
B. M. W. Hanson
By his Attorneys,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FEEDING MECHANISM.

940,929.   Specification of Letters Patent.   Patented Nov. 23, 1909.

Application filed April 20, 1909. Serial No. 491,101.

*To all whom it may concern:*

Be it known that I, BENGT M. W. HANSON, a citizen of the United States, residing at Hartford, in the county of Hartford and State of Connecticut, have invented certain new and useful Improvements in Feeding Mechanism, of which the following is a specification.

This invention relates to what I shall for convenience term "feeding mechanism."

Feeding mechanism comprising my invention is susceptible of advantageous use in many different connections although it is of especial utility when employed in conjunction with or forming part of a grinding machine as represented in the accompanying drawings wherein I illustrate in detail one form of embodiment of the invention.

For the purpose of enabling those skilled in the art to practice the invention I will fully set forth in the following description said form of embodiment while the novelty of the invention will be included in the claims succeeding said description.

From the statements just made it will be clear that I do not restrict myself to the disclosure made by said description and drawings as many variations therefrom may be made within the scope of my claims; some of these will be specifically referred to while others may be inferred. I provide a mechanism effective in nature by which both rapidity and accuracy can be assured.

Figure 2:
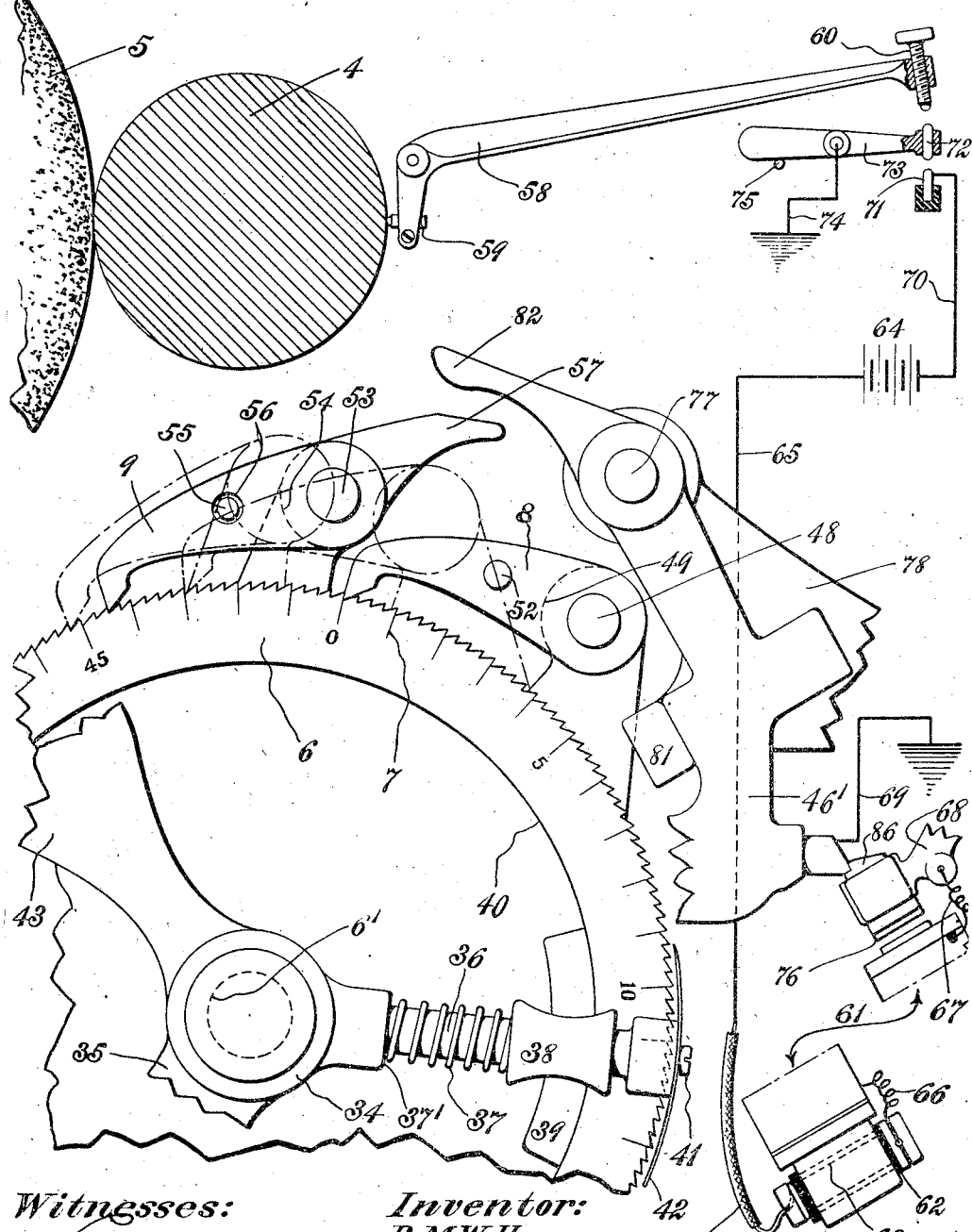
Figure 3:
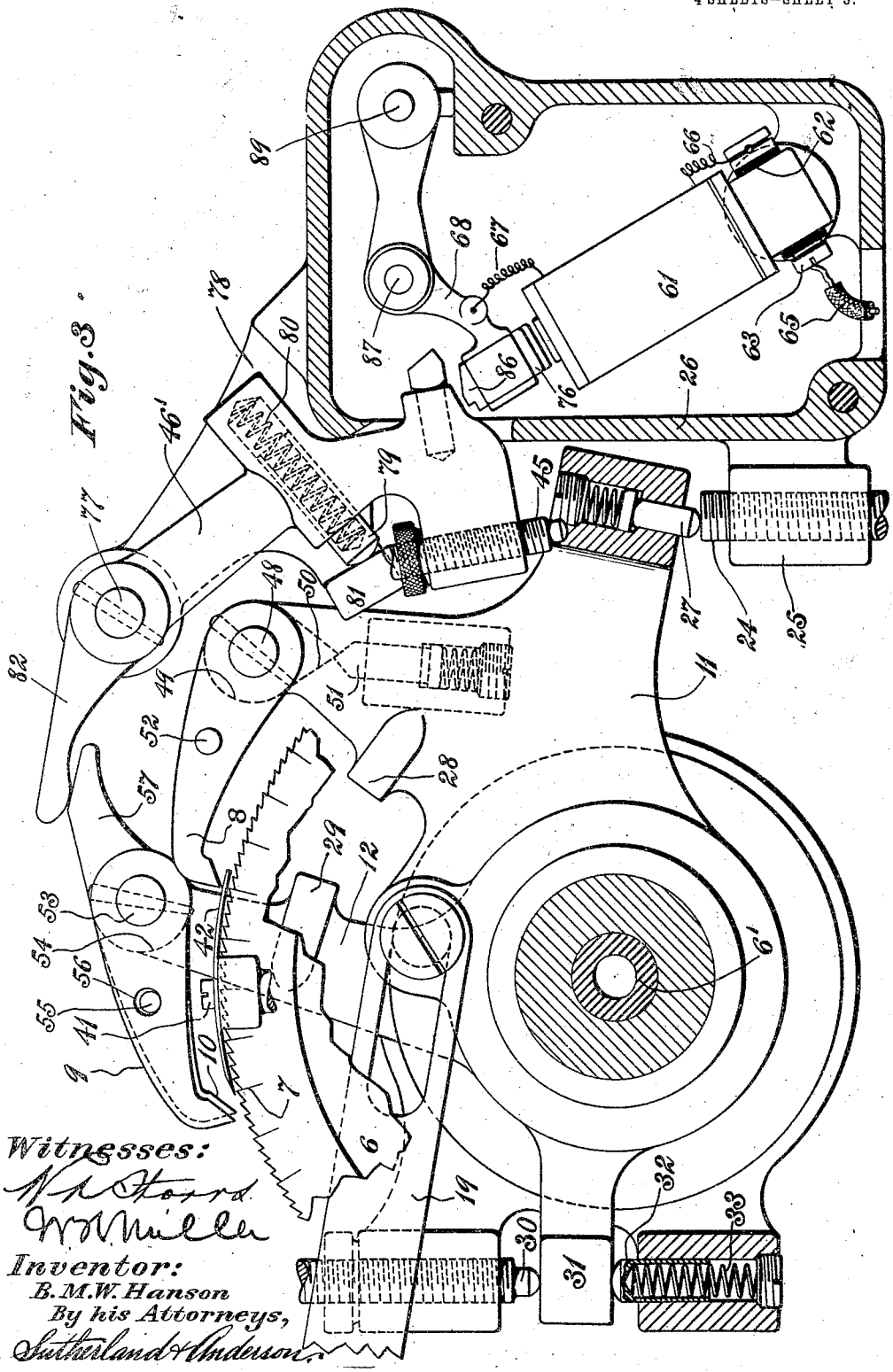

Referring to said drawings, Figure 1 is a sectional front elevation of feeding mechanism involving my mechanism showing the same associated with a grinding machine also represented in sectional front elevation. Figs. 2 and 3 are sectional front elevations of said feeding mechanism showing the parts thereof in different positions, Fig. 2 being somewhat diagrammatic and showing a feeler and certain coöperating devices of said grinding machine. Fig. 4 is a sectional top plan view of said feeding mechanism. Fig. 5 is a top plan view of a magnet, its armature and certain adjunctive devices, and, Fig. 6 is a detail view of the said magnet and its armature the latter being in section.

Said views are on different scales while throughout them like characters refer to like parts.

I have represented in certain figures of the drawings portions of a grinding machine of known construction with which my feeding mechanism successfully coöperates and so that the action and advantages of said feeding mechanism may be better understood I will describe in brief said grinding machine.

The framework of the machine is denoted in a general way by 2 and it is made in the form of a bed to receive the carriage 3 the latter in the present case moving longitudinally of said bed. In addition to said carriage 3 there is a second carriage which I do not deem it necessary to show but which in practice reciprocates on said bed crosswise thereof. The carriage 3 usually supports the work which I have denoted by 4 and said work is given a rotary movement while the carriage which supports the tool 5 is given an intermittent or step by step advancing movement toward the work so that when a piece is being ground the carriage 3 is being fed longitudinally of the bed 2 while the tool-carriage is being progressively moved transversely of the bed so as to effect the reduction of the work to the predetermined size. There may be cases where I might rearrange the parts of the grinding machine but I prefer that they be related in the manner set forth.

My feeding mechanism involves several salient features one of them including ratchet-wheel mechanism, primary and secondary pawls for giving to the ratchet-wheel mechanism different degrees of movement, and a device progressively movable with said ratchet-wheel mechanism for throwing the pawl out of action said device being also manually settable and this combination of parts provides a means whereby the number of steps to be taken by the secondary pawl, after the primary pawl has been thrown out of action can be regulated with certainty and preciseness. In other words I can determine definitely how many steps will be taken by the secondary pawl which is an important result. In conjunction with the elements stated or their equivalents I prefer to provide means for preventing said device from moving beyond the point at which it throws the primary pawl out of action so that for example after having ground down one piece of work I can without changing any adjustment repeat the operation with a similar piece of work. I wish to make it clear that I use the term "ratchet-wheel mechanism" in its generic sense to include one or more ratchet-wheels although a single ratchet-wheel as will hereinafter appear has its peculiar advantages.

The ratchet-wheel to which I have referred may be connected with the tool-carriage in any desirable manner and it will be evident that each time the ratchet-wheel is operated the tool-carriage is advanced a corresponding extent, it being also obvious that the said tool-carriage is initially given a series of coarse steps and finally a series of fine steps although it is conceivable that there might be but one of each of said steps.

A ratchet-wheel such as satisfactorily answers my purpose is shown in the drawings being denoted by 6 and being laterally graduated as at 7 the graduated surface presenting an easy means for properly locating the wheel or for positioning a throw-out device as will hereinafter more fully appear. Said ratchet-wheel 6 is rigidly fastened in some suitable manner to the shaft 6' rotatively supported by the framework of the machine, and from which through the intervention of suitable means the tool-carriage receives its advancing motion.

In connection with said ratchet-wheel 6 I provide a primary pawl as 8 and secondary pawls as 9 and 10 although it is not essential that two secondary pawls be provided although by providing two of such pawls and disposing one so that it will operate the ratchet-wheel in advance of the other or vice versa I can secure the advantage of a ratchet-wheel having much finer teeth than the one shown. As will be obvious I can obtain with a finer toothed ratchet than that shown and a single secondary pawl a fine feed but I can secure the same result by having the pawls related in the manner indicated. The degrees of movement of the pawls 8 and 9 and 10 are different that of the pawl 8 being greater than that of the secondary or supplemental pawls 9 and 10 the former being employed to secure the initial or coarse feed of the tool carriage while the secondary pawl or pawls are utilized for obtaining the final and fine feed of the said carriage.

The carrier for the primary pawl is denoted by 11 while that for the secondary pawls is designated by 12 and while the particular mounting of these carriers is not a matter of consequence I prefer that they be oscillatory. In the present case said carriers are loose on the shaft 6'. As will hereinafter appear the secondary pawl carrier 12 is operated by or from the primary pawl carrier 11 so that even after the pawl 8 is thrown out of action the carrier 11 can remain in motion and thereby actuate the carrier 12.

I will now describe the means for operating the primary pawl carrier and hereinafter indicate more fully how the secondary carrier is operated from the primary or main pawl carrier.

In practice the carriage 3 is provided with two tappets or dogs only one of which is shown being denoted by 13 and these tappets alternately strike and swing the rocker 14 the pivot or center of which is designated by 15. Said rocker is shown as equipped with a rigid segment or sector 16 the teeth of which mesh with a pinion 17 with which a crank arm 18 is rigidly connected. To the outer end of said crank arm I have represented as pivoted a connecting rod 19 having a loose connection with the main pawl carrier 11. The body of the rocker 14 is preferably made hollow to receive a spring plunger 20 against which the push spring 21 operates the upper end of said spring bearing against the plug 21' closing the upper end of the body of said rocker and which plug in the present case is alternately engaged by said tappets. On the framework is a rock-arm 22 the upper oppositely beveled portion 23 of which coöperates with a substantially similar portion at the lower end of the spring plunger 20 by reason of which as said rocker 14 is swung the spring 21 will be compressed to carry said rocker over the center. The mechanism between the tappets and the rock-arm 22 is common for which reason it is not necessary for me to describe the same in detail. It will be apparent, however, that by said mechanism the rod 19 will be reciprocated as the work-supporting carriage 3 travels back and forth. I have shown by full lines the rocker 14 and rod 19 in one extreme position and by dotted lines the other extreme position and the intermediate position. As the rod 19 is moved to the right in the present case the carrier 11 will be correspondingly moved and on this stroke of said carrier the pawl 8 carried thereby is effective for feeding the ratchet-wheel 6 while on the return or back stroke of said carrier 11 said pawl 8 rides idly over the teeth of said ratchet-wheel. I might state at this point that the advancing movement of said carrier 11 is effected by power while the return stroke is secured by the weight of the said carrier itself; in other words said carrier is self-active on its return movement it having sufficient weight to insure this action. The swing or stroke of the carrier 11 can be governed manually so as to regulate the number of teeth that the primary pawl 8 covers in one operation or to define the amount of movement of the ratchet-wheel 6 and thereby control the step feed of the tool-carriage. For this purpose I may provide a stop as 24 shown as a screw, extending through a lug 25 on the housing or boxing 26 supported by the framing 2. By running said screw up or down the amount of movement of the primary pawl carrier 11 can be governed. The stop screw 24 may be engaged by a spring-plunger or buffer 27 on said rocker by reason of which shock or jar will be eliminated on the back stroke of said rocker 11 during which the motion thereof is somewhat accelerated.

The main carrier 11 is shown as having a projection 28 coöperating with a projection 29 on the secondary or supplemental carrier 12 said projection 29 being in the path of the projection 28 and the two carriers are so related that when the main carrier 11 has practically completed its forward stroke the projection 28 will impinge against the projection 29 and thereby drive the secondary or auxiliary carrier 12 forward so that the secondary pawls 9 and 10 can perform their functions. It will be evident that the main or primary carrier 11 moves through a relatively considerable arc with respect to the secondary carrier 12 the consequence being that the degree of movement of the main or primary pawl 8 is much greater than that of the secondary or auxiliary pawls 9 and 10. The amount of stroke of the secondary or auxiliary pawl carrier 12 may be also controlled and for this purpose an adjustable stop as 30 may be provided said stop being shown as a screw tapped through some relatively fixed part of the machine and adapted to engage an extension 31 of said carrier 12. Said extension 31 is also coöperative with a spring-plunger 32 the spring 33 of which furnishes the power for retracting the carrier 12 in a rapid manner. The spring-plunger 32 in the present instance bears at all times against said extension and in Fig. 3 the latter is shown as bearing against the lower end of the stop 30 both carriers 11 and 12 being in their retracted positions. When the carrier 11 has advanced the carrier 12 in the manner previously described the extension 31 as it is swung down on the advancing movement of the carrier 12 puts the spring 33 under maximum compression so that said spring by acting against said extension through the plunger 31 can apply to the carrier 12 a thrust sufficient to retract the same. As will hereinafter appear I throw the primary pawl out of action and I can regulate the exact point at which this action occurs; in the present case this operation is effected by lifting said primary pawl out of engagement with the teeth of the ratchet-wheel but when the pawl is thus lifted the motion of the carrier 11 is not stopped as the movement of said primary carrier is utilized to effect the rocking of the secondary carrier as will be obvious.

Loosely supported by the shaft 6' is a sleeve 34 provided with a radial arm 35 and with a stem or stud 36 encircled by a push spring 37 bearing at one end against a shoulder 37' on said stem and at the other against a sleeve 38 with which is integral a segment or shoe 39 said sleeve being slidable upon said stem or stud 36. The outer surface of this shoe is pressed against the inner surface of the annular off-standing flange or bead 40 of the ratchet-wheel 6, the frictional engagement between the ratchet-wheel and shoe being sufficient as to carry the shoe and its associated parts around with said ratchet wheel when the latter is turned. The outer end of the stem or stud 36 is somewhat enlarged and to this enlarged portion I fasten as by screws 41 the shield 42 which is shown as consisting of a longitudinally curved plate and the length of which is practically equal to the maximum stroke of the pawl 8. The sleeve 34 is provided with a balance weighted arm 43 so that said sleeve and the parts associated therewith have no tendency in themselves to move. Said sleeve 34 and said associated parts present a throw-out device for the primary pawl and such throw out device as will be apparent moves progressively with the ratchet-wheel 6. Owing to its mounting it may be set by hand so that the point at which the primary pawl is to be thrown out of action can be precisely governed. Therefore one of the important features of the invention is a throw-out device for putting a pawl out of action which moves progressively or intermittently with the ratchet-wheel mechanism and which is also capable of manual setting whether said throw-out device be connected with said ratchet-wheel or not although by making such connection excellent results are secured. Said throw-out device can be swung around relatively to the ratchet-wheel and the pawl lifting plate or shield 42 can be positioned to lift the pawl 8 after the ratchet-wheel 6 has made any predetermined number of strokes. As will be evident the three pawls 8, 9 and 10 operate the teeth of the ratchet-wheel but the transverse extent of the shield is sufficient to affect only the primary pawl 8. It will be assumed that the operator of the machine has so adjusted the shield 42 that it occupies the position shown in Fig. 2, and that the machine is thereafter put into motion. On each movement of the ratchet-wheel 6 the shield is moved a corresponding distance. When said shield strikes the primary pawl 8 the latter will be lifted out of engagement with the ratchet-wheel 6. In connection with a throw-out device of the character set forth or its equivalent I provide means for preventing said throw-out device moving beyond the point at which the said throw-out device puts the primary pawl out of action and I will hereinafter describe a means for securing this result. By virtue of this organization I can accurately repeat a previous operation which I could not do were the shield or its equivalent moved beyond the point at which it rendered the primary pawl ineffective. The means for arresting the pawl throw out device, shown in the drawings consists of a screw 45 whereby adjustability is obtained and this screw is shown as tapped through a part of a movable member as 46' and an advantage for this particular mounting of said stop or screw will be hereinafter pointed out. The member 46' it should be stated is normally at rest or has no motion during the time the pawl 8 is in effective operation and for a time subsequent thereto. The lower end of said screw 45 coöperates with a projection or lug 46 on the arm 35 constituting part of the pawl throw-out device.

I deem it proper at this point to refer in part to the operation of the machine. It will be assumed that a piece of work is to be ground down to a certain size. In this event a gage-piece corresponding exactly in diameter with that which the piece of work when finished, is to have, is mounted on the work-carriage just as the work would be and the feeler hereinafter described is placed against the periphery of the work. The tripping or releasing mechanism which throws the auxiliary or secondary pawls out of action is then adjusted after which the rocker 14 is swung over to the left in Fig. 1 thereby through the intermediate parts, advancing both carriers 11 and 12 to the limits respectively of their forward strokes the two carriers being in the position then which they would occupy after the work had been sized or at the conclusion of the last step of the final or fine feed. Of course the several pawls 8, 9 and 10 are lifted out of engagement with the ratchet wheel 6 on this adjustment. The screw 45 prior to this time will if necessary be backed out. The pawls are then permitted to fall into engagement with the ratchet wheel following which the shield 42 is moved forward until it lifts the pawl 8 out of engagement with the ratchet-wheel. The distance then between the tip of front end of the shield 42 and the primary pawl 8 will be known and this interval indicates the number of steps the ratchet-wheel 6 will be fed by the secondary or auxiliary pawls after the primary pawl has been thrown out of action. Therefore in this way the exact amount of movement of the ratchet wheel under the final feed pawls can be regulated at will. When the regulation has been made the screw 45 will be run down until it engages the lug 46 after which the parts will be put into action which means that the primary pawl is thrown out of action a known number of teeth before the secondary pawls are rendered inactive and also that this operation can be repeated again with unfailing accuracy by providing the means which prevent the movement of the throw-out device beyond its pawl throwing out adjustment. Therefore I can regulate not only the point at which the coarse feed ceases or the exact amount of fine feed but can accurately repeat an operation which is important when it is desired to grind down several pieces of similar work to a standard size. While the arresting of the pawl throw-out device is highly important there may be cases where this feature might be omitted.

The pawl 8 is shown as rigidly fastened to a pivot or pin 48 supported for rocking motion by a bearing 49 extending laterally from the carrier 11 said pin rigidly carrying at its inner end a tail-piece 50 of beveled shape and coöperative with a similarly formed portion at the upper end of the spring plunger 51 carried by said carrier 11 said spring plunger presenting an automatically operative latch for holding the pawl 8 either down (its effective position) or up said pawl being provided with a pin 52 by which it can be more readily manipulated.

The pawl 9 is preferably rigid with a pin or pivot 53 supported for rocking motion by a bearing 54 on the carrier 12 while the adjacent pawl 10 is loose on said pin or pivot 53. The points of said two pawls are so set that one of them operates in advance of the other a half tooth. From the inner or loosely mounted pawl 10 there extends outward a stud 55 which projects freely into a hole 56 in the companion pawl 9 whereby a certain amount of relative movement of said two secondary pawls is permitted although as will hereinafter appear they can be thrown out of action together. From the pin 53 there extends the tail-piece 57 and this provides a simple means in connection with a suitable knock-off device for simultaneously throwing the two secondary pawls out of action. The loose connection between said pawls it might be explained permits their free up and down relative movement although both are advanced as one or in synchronism. By depressing the tail-piece 57 both pawls 9 and 10 will be lifted free of the ratchet-wheel in unison, and means for securing this result will be hereinafter described. I have alluded hereinbefore to a work-engaging feeler. This feeler through the agency of suitable mechanism throws the secondary pawl or pawls out of action although it plays no part in throwing the primary pawl out of action as will be evident from what I have already stated. I will now set forth the means illustrated for obtaining the first mentioned result.

A feeler such as answers my purpose is denoted by 58 and it is composed of a lever having angularly disposed short and long arms the short arm thereof having an adjustable device 59 which directly engages the work while the long arm is shown as provided at its free end with a device as the screw 60 for closing a normally open circuit. The screw is adjustable so that the point at which the secondary pawls are thrown out of action can be governed. It might be stated at this point that the means which throw the secondary pawls out of action are caused to operate when said circuit is closed.

Said electric circuit involves an electromagnet 61 into the frame of which is set an insulating bushing 62 to receive a metallic pin 63, said bushing providing a simple means for insulating said magnet from the framework of the machine. A battery is shown at 64 and from said battery the conductor or wire 65 leads to said pin 63. Said wire is connected to one end of said pin a short length of wire 66 leading from the other end of said pin to the coils of said magnet a similar short length of wire 67 leading from the said coils to the armature lever 68. The armature lever in the present case constitutes a latch and normally engages the shiftable member 46' to which I have hereinbefore alluded. From said armature lever a wire 69 extends to ground which in the present case is through the framework of the machine. The wire 65 extends from one pole of the battery 64. From the other pole of said battery the wire 70 extends and leads to the contact 71 supported by and insulated from some suitable relatively fixed part of the work-carriage 3. Said contact 71 is coöperative with a contact 72 carried at one end of a lever 73 also supported by said relatively fixed part of said carriage said lever having a ground connection 74 and being limited by a suitable stop as 75. The electrical connections just described are best shown in Fig. 2. The space between the contacts 71 and 72 constitutes the break in the circuit and the feeler 58 constitutes means for closing said circuit. As the work is reduced in size, the longer arm of the feeler falls thereby moving the screw 60 toward the contact 72 and at a certain point said lever 58 will operate the lever 73 so as to force the contact 72 into engagement with the contact 71, this operation occurring when the work has been reduced in diameter to the predetermined size. As soon as the circuit is closed the magnet 61 is energized and attracts its armature 76 on the lever 68 which it will be observed is pivotally mounted for swinging movement, between its ends in the casing or housing 26 to which I have hereinbefore referred. When the magnet is energized the secondary pawls 9 and 10 are thrown out of action. It will be apparent therefore that while the primary pawl 8 is controlled independently of the feeler 58 or some analogous device, the secondary pawl or pawls are not as they are thrown out of action by means governed by said feeler.

It will be remembered that the armature lever 68 has been described as constituting a latch it engaging a part of the swinging member 46' to normally prevent movement of the latter. Said swinging member 46' is shown as fastened to a pin 77 supported for rocking motion by a bracket 78 rising from the housing or casing 26. The swinging member 46' is shown provided with a spring-plunger 79, the spring of which is denoted by 80 and the tip of said plunger normally bears against the projection 81 on said bracket to maintain said spring 80 under compression, it being evident that at this time the armature lever or latch 68 is holding said swinging member 46' against shifting movement by the spring 80. When the said armature lever or latch, however, is tripped the member 46' will be released so that the same can be swung over from its normal position shown in Fig. 1 to its shifted position represented in Fig. 3 the spring 80 furnishing the power to secure this function. The member 46' constitutes a secondary pawl throw-out or knock-off device or a suitable means for putting the secondary pawls 9 and 10 simultaneously out of action, having for this purpose an actuator part 82 which may consist of an arm rigid with the pin or stud 77. It will be remembered that the magnet 61 is energized at the time when the work has been ground to predetermined size and that when this takes place the device 46' is thrown over. During the swing of said part 46' under the action of the spring 80 the arm 82 is carried against the tail-piece 57 so as to lift the points of both pawls 9 and 10 from out of engagement with the ratchet-wheel 6 the consequence being that further movement of said pawl automatically is at once arrested. When said part 46' is swung over by said spring 80 the stroke of the former is sufficient to carry the screw 45 out of the path of the projection or lug 46 so that when the feeding mechanism is finally put out of action the ratchet wheel 6 can be run forward or backward by hand without interference or obstruction. A hand-wheel for such purpose is shown at 83 although it is not necessary for me to illustrate any of the connections between the same and the feed-mechanism. Owing to the fact that the screw 45 is carried out of the path of the lug or projection 46 there is no possibility of disturbing a prior adjustment.

The armature 76 is mounted in a novel manner on the armature lever as will now appear. From said armature 76 which is made in the form of a plate, there extends a pin 84 the head of which is adapted to fit a countersink in the armature portion or end of said lever, said pin being encircled by a comparatively weak push spring 85 which by acting against the head of said pin holds said armature in its retracted position. On the energization of the magnet 61 the armature 76 is first attracted and is drawn away from the said lever until said armature is in the strongest portion of the field of said magnet at which time the lever is drawn to its shifted or releasing position. In this manner while the action is practically instantaneous the pull of the magnet is gradual, i. e., it is not suddenly loaded. The lever 68 has a pin 86 driven into its head or armature end and this pin is notched to receive the tail portion of the swinging member 46. Said lever 68 is loosely mounted upon a pivot pin 87 supported within the boxing 26 and insulated therefrom by a bushing as 88. The tail portion of said lever is provided with a laterally projecting portion or handle 89 by which the same can be readily operated to effect the tripping of the secondary pawl knock-off or throw-out mechanism by hand or when desired such as would be the case in mounting a gage piece in position as hereinbefore stated.

It will be assumed that there are several pieces of work to be ground to the same and a predetermined size. A gage-piece exactly agreeing in size with that of the work when finished is mounted on the tool carriage, the finger or screw of the feeler 58 is placed against the periphery of the gage piece and the pawls, their carriers 11 and 12 and screw 45 are adjusted as hereinbefore fully stated. With the feeler against the gage-piece the screw is adjusted to a position to bring the contacts 72 and 71 into engagement as this is the relation which ensues when the feeding mechanism is thrown out of action. The gage-piece is then dismounted and the work put into its place with the feeler 58 against the same. The grinding then commences, the work-carriage 3 being reciprocated during grinding. As the carrier 11 oscillates through the agency of said carriage and intermediate mechanism as hereinbefore stated, the pawl 8 feeds the ratchet wheel 6 and the tool carriage is advanced toward the work a distance corresponding to the movement of said ratchet-wheel. This action continues until the shoe 42 lifts the pawl 8 out of action and when this occurs the lug or projection 46 strikes against the adjustable stop or screw 45 thereby preventing further movement of the said shoe with the ratchet-wheel. The carrier 11, however, continues in motion so as to cause the rocking of the carrier 12 and thereby the operation of the pawls 9 and 10 and this will continue until the work is reduced to the determined extent at which point the feeler 58 will have caused the contact 72 to engage the contact 71 and thereby energize the magnet 61. When said magnet is energized the armature 68 is tripped thereby releasing the spring-operable member 46' which on its swing projects the finger 82 thereon against the pawls 9 and 10 sufficient to raise said pawls clear of said ratchet-wheel 6 and at the same time carries the stop 45 out of the path of the lug 46.

What I claim is.

1. The combination of ratchet-wheel mechanism, primary and secondary pawls for giving to said ratchet-wheel mechanism different degrees of movement, and a device progressively movable with the ratchet-wheel mechanism for throwing the primary pawl out of action.

2. The combination of ratchet-wheel mechanism, primary and secondary pawls for giving to the ratchet-wheel different degrees of movement, a device progressively movable with said ratchet-wheel mechanism, for throwing said primary pawl out of action said device being also manually settable, and means for preventing said device moving beyond the point at which it throws said primary pawl out of action.

3. The combination of ratchet-wheel mechanism, primary and secondary pawls for giving to said ratchet-wheel mechanism different degrees of movement, a device progressively movable with said ratchet-wheel mechanism, for throwing the primary pawl out of action and also manually settable, and adjustable means for preventing said device from moving beyond the point at which it throws said primary pawl out of action.

4. The combination of ratchet-wheel mechanism, primary and secondary pawls for giving to the ratchet-wheel different degrees of movement, a device progressively movable with said ratchet-wheel mechanism, for throwing said primary pawl out of action and also manually settable, and a screw to prevent said device from moving beyond the point at which it throws the primary pawl out of action.

5. The combination of ratchet-wheel mechanism, primary and secondary pawls for giving to said ratchet-wheel mechanism different degrees of movement, a device progressively movable with said ratchet-wheel mechanism, for throwing said pawl out of action said device being also manually settable, stop-means for preventing said device moving beyond the point at which it throws said pawl out of action, and a movable support for said stop means.

6. The combination of ratchet-wheel mechanism, primary and secondary pawls for giving to said ratchet-wheel mechanism different degrees of movement, a device progressively movable with said ratchet-wheel mechanism, for throwing said primary pawl out of action and also manually settable, stop means for preventing said device moving beyond the point at which it throws said primary pawl out of action, an automatically-movable support for said stop-means, and means for normally preventing the movement of said automatically-movable support.

7. The combination of a ratchet-wheel, a primary pawl for operating said ratchet-wheel, a plurality of secondary pawls for operating said ratchet-wheel, one of said secondary pawls being set to operate in advance of the other, means for operating said pawls and for giving to the primary pawl a greater degree of movement than the secondary pawls, and means for throwing the primary pawl out of action at a predetermined point.

8. The combination of a ratchet-wheel, a primary pawl for operating said ratchet-wheel, a plurality of secondary pawls for operating said ratchet-wheel, one of said secondary pawls being set to operate in advance of the other, means for operating said pawls and for giving to the primary pawl a greater degree of movement than the secondary pawls, means for throwing the primary pawl out of action, and means for subsequently throwing the secondary pawls out of action.

9. The combination of a ratchet-wheel, a primary pawl for operating said ratchet-wheel, a plurality of secondary pawls for also operating said ratchet-wheel one of said secondary pawls being set to operate in advance of the other and one of them having a hole and the other a pin to enter said hole to thereby connect said secondary pawls for relative movement, means for operating said pawls and for giving to the primary pawl a greater degree of movement than the secondary pawls, and means for throwing the primary pawl out of action at a predetermined point.

10. The combination of a ratchet-wheel, a primary pawl for operating said ratchet-wheel, a pair of secondary pawls for also operating said ratchet-wheel one of said secondary pawls being set to operate in advance of the other, means for operating the several pawls and for giving to the primary pawl a greater degree of movement than the secondary pawls, means for throwing the primary pawl out of action at a predetermined point said means being progressively movable with said ratchet-wheel, and means for preventing the movement of said throwing out means beyond the point at which said primary pawl is thrown out of action.

11. The combination of an automatically-active, work-engaging feeler, primary and secondary feed mechanisms the primary feed mechanism having a different degree of movement than the secondary feed mechanism, mechanism operable independently of the feeler for throwing the primary feed mechanism out of action at a predetermined point, and means operable by the feeler for subsequently throwing the secondary feed mechanism out of action.

12. The combination of a ratchet-wheel, a primary pawl for operating said ratchet-wheel, a secondary pawl for also operating said ratchet-wheel, means for operating the said pawls and for giving to the primary pawl a greater degree of movement than the secondary pawl, an automatically-active work-engaging feeler, means operative independently of said feeler for throwing the primary pawl out of action at a predetermined point, an electric circuit, means operable with the feeler for controlling said circuit, and means for throwing the secondary pawl out of action, operated by and from said circuit when thus controlled.

13. The combination of a ratchet-wheel, a primary pawl for operating said ratchet-wheel, a secondary pawl for also operating said ratchet-wheel, means for operating said pawls and for giving to the primary pawl a greater degree of movement than the secondary pawl, and mechanism for throwing said pawls successively out of action and for also regulating the interval between the times at which said pawls are thrown out of action.

14. The combination of a ratchet-wheel, a primary pawl for operating said ratchet-wheel, a secondary pawl for also operating said ratchet-wheel, means for operating said pawls and for also giving to the primary pawl a greater degree of movement than the secondary pawl, and mechanism for throwing the primary pawl out of action at a predetermined point and for also regulating thereafter the number of steps to be taken by the secondary pawl.

15. The combination of a ratchet-wheel, primary and secondary pawls for operating said ratchet-wheels, carriers for said pawls the carrier for one of the pawls serving to operate the carrier for the other pawl, and mechanism for operating that carrier which operates the companion carrier.

16. The combination of ratchet-wheel mechanism, primary and secondary pawls for operating said ratchet-wheel mechanism, carriers for the pawls the carrier for the primary pawl serving to operate the carrier for the secondary pawl, mechanism for operating the primary pawl carrier, and means for throwing the pawls successively out of action.

17. The combination of ratchet-wheel mechanism, primary and secondary pawls for operating said ratchet-wheel mechanism, a carrier for the primary pawl, a carrier for the secondary pawl, operable by the other carrier, mechanism for operating the primary pawl carrier, and means for throwing the primary pawl out of action without stopping the motion of the primary pawl carrier.

18. The combination of ratchet-wheel mechanism, primary and secondary pawls for operating said ratchet-wheel mechanism, a carrier for the primary pawl, a carrier for the secondary pawl, operable by the other carrier, mechanism for operating the primary pawl carrier, means for throwing the primary pawl out of action without stopping the motion of the primary pawl carrier, and means for subsequently throwing the secondary pawl out of action.

19. The combination of a ratchet-wheel, a primary pawl for operating said ratchet-wheel, a secondary pawl for also operating said ratchet-wheel, a carrier for the primary pawl, a carrier for the secondary pawl, operable by the other carrier, means for operating the primary pawl carrier, means for throwing the primary pawl out of action without stopping the motion of the primary pawl carrier, and means for preventing the movement of said throwing out means beyond the point at which the same throws said primary pawl out of action.

20. The combination of a ratchet-wheel, a primary pawl for operating said ratchet-wheel, a secondary pawl for also operating said ratchet-wheel, a carrier for the primary pawl, a carrier for the secondary pawl, operable by the other carrier, means for operating the primary pawl carrier, means for throwing the primary pawl out of action without stopping the motion of the primary pawl carrier, means for subsequently throwing the secondary pawl out of action, and means for preventing the movement of said throwing out means beyond the point at which the same throws said primary pawl out of action.

21. The combination of a ratchet-wheel, a primary pawl for operating said ratchet-wheel, a secondary pawl for also operating said ratchet-wheel, a pair of carriers for the primary and secondary pawls oscillatory with respect to and about the axis of said ratchet-wheel, the secondary pawl carrier being operable by the primary pawl carrier, mechanism for operating the primary pawl carrier, and means progressively movable with the ratchet-wheel for throwing the primary pawl out of action at a predetermined point.

22. The combination of an automatically-active, work-engaging feeler, primary and secondary feed mechanisms, means operable by said primary and secondary feed mechanisms said mechanisms being operable to give to said means different degrees of movement, means for throwing the primary feed mechanism out of action at a predetermined point, and means for preventing said throwing out means from moving beyond the point at which the same throws said primary feed mechanism out of action.

23. The combination of a ratchet-wheel, a pawl for operating said ratchet-wheel, a device for throwing the pawl out of action at a predetermined point and progressively movable with said ratchet-wheel, means for preventing said throwing out device moving beyond the point at which it throws the pawl out of action, and a movable support for said last mentioned means.

24. The combination of a ratchet-wheel, a primary pawl for operating said ratchet-wheel, a secondary pawl for also operating said ratchet-wheel, a carrier for the primary pawl, a carrier for the secondary pawl, operable by the other carrier, means for operating the primary pawl carrier, a device for throwing the primary pawl out of action without stopping the carrier therefor, and means for preventing the movement of said device beyond the point at which it throws said device out of action and movably mounted.

25. The combination of a ratchet-wheel, a primary pawl for operating said ratchet-wheel, a secondary pawl for also operating said ratchet-wheel, a carrier for the primary pawl, a carrier for the secondary pawl, operable by the other carrier, means for operating the primary pawl carrier, throw out means for throwing the primary pawl out of action at a predetermined point, progressively movable with the ratchet wheel and also manually settable, stop means for preventing the movement of said throw out means beyond the point at which the same throws said primary pawl out of action, a movably mounted, automatically active device supporting said stop means, and means for normally preventing the movement of said automatically active device.

26. The combination of a ratchet-wheel, a primary pawl for operating said ratchet-wheel, a secondary pawl for also operating said ratchet-wheel, carriers for the primary and secondary pawls both oscillatory and the carrier for the secondary pawl being operable by the carrier for the primary pawl, means for operating the primary pawl carrier, a device progressively movable with said ratchet wheel for throwing the primary pawl out of action, an automatically-active, work-engaging feeler, an electric circuit having a magnet, means operative with said feeler for closing said circuit, stop means for preventing the movement of said throw out device beyond the point at which it throws said primary pawl out of action, a spring-operated device supporting said stop means and also provided with means for throwing the secondary pawl out of action, and a latch operable by said magnet, for normally holding said spring-operated device against movement.

In testimony whereof I affix my signature in presence of two witnesses.

BENGT M. W. HANSON.

Witnesses:
W. M. STORRS,
W. H. MILLER.